United States Patent [19]

Kleimann et al.

[11] 4,201,847

[45] May 6, 1980

[54] PROCESS OF PREPARING FOAMS WITH INTERNAL MOLD-RELEASE AGENTS

[75] Inventors: Helmut Kleimann; Wulf von Bonin, both of Leverkusen; Heinz-Georg Schneider, Gummersbach, all of Fed. Rep. of Germany

[73] Assignee: Bayer Aktiengesellschaft, Leverkusen, Fed. Rep. of Germany

[21] Appl. No.: 924,260

[22] Filed: Jul. 13, 1978

Related U.S. Application Data

[63] Continuation of Ser. No. 438,071, Jan. 30, 1974, abandoned.

[30] Foreign Application Priority Data

Feb. 16, 1973 [DE] Fed. Rep. of Germany ....... 2307589

[51] Int. Cl.² ...................... C08G 18/14; C08G 18/36
[52] U.S. Cl. .................................... 521/172; 252/182; 260/18 TN; 260/97.5; 521/130; 521/132; 521/160; 521/162; 264/300
[58] Field of Search ............... 521/130, 132, 160, 162, 521/172; 264/300

[56] References Cited

U.S. PATENT DOCUMENTS

| | | | |
|---|---|---|---|
| 2,850,464 | 9/1958 | Mitchell | 260/2.5 |
| 3,092,592 | 6/1963 | Nischk et al. | 260/2.5 |
| 3,110,695 | 11/1963 | Ceresa | 260/45.5 |
| 3,178,490 | 4/1965 | Petrino et al. | 264/41 |
| 3,182,104 | 5/1965 | Civik | 264/45.5 |
| 3,201,359 | 8/1965 | Herrick et al. | 521/132 |
| 3,304,273 | 2/1967 | Stamberger | 260/2.5 |
| 3,383,351 | 5/1968 | Stamberger | 260/33.2 |
| 3,394,164 | 6/1968 | McClellan et al. | 260/453 |
| 3,442,925 | 5/1969 | Simmler et al. | 260/448.2 |
| 3,481,963 | 12/1969 | Simmler et al. | 260/448.2 |
| 3,492,330 | 1/1970 | Trecker et al. | 260/453 |
| 3,523,093 | 8/1970 | Stamberger | 260/2.5 |
| 3,567,763 | 3/1971 | Emmons et al. | 260/478 |
| 3,579,471 | 5/1971 | Dijkhuizen et al. | 521/130 |
| 3,637,539 | 1/1972 | Wolff et al. | 260/2.5 |
| 3,726,952 | 4/1973 | Boden et al. | 264/48 |
| 3,793,268 | 2/1974 | Dietrich et al. | 260/2.5 AT |
| 3,827,993 | 8/1974 | Cunningham et al. | 260/22 EP |

FOREIGN PATENT DOCUMENTS

| | | |
|---|---|---|
| 1559325 | 3/1969 | France . |
| 848671 | 9/1960 | United Kingdom . |
| 874430 | 8/1961 | United Kingdom . |
| 994890 | 6/1965 | United Kingdom . |
| 1162517 | 8/1969 | United Kingdom . |

OTHER PUBLICATIONS

DAS 1,196,864, Philco, Jul. 15, 1965.
DAS 1,202,785, Scholven-Chemie, Oct. 14, 1965.
DOS 1,953,637, Bayer A/G, Apr. 29, 1971.
DOS 2,121,670, Bayer A/G, Nov. 16, 1972.

*Primary Examiner*—H. S. Cockeram
*Attorney, Agent, or Firm*—Gene Harsh; Joseph C. Gil; R. Brent Olson

[57] ABSTRACT

A reaction product of a fatty acid ester and an organic polyisocyanate is included in a foamable reaction mixture containing an organic polyisocyanate to provide a molded product which can be removed from a mold whose surface has not been coated with conventional mold release agents.

12 Claims, No Drawings

PROCESS OF PREPARING FOAMS WITH INTERNAL MOLD-RELEASE AGENTS

This is a continuation, of application Ser. No. 438,071 filed Jan. 30, 1974, now abandoned.

This invention relates to a process for making molded foam resins having improved properties which facilitate release of the foam from a mold.

Foam resins based on organic polyisocyanates, e.g. polyurethane foams which have a dense outer skin and a cellular core as obtained by the method of foaming in the mold (German Auslegeschrift No. 1,196,864 and French Pat. Specification No. 1,559,325) are eminently suitable for the series production of lightweight constructions, e.g. for the manufacture of furniture, vehicles and buildings.

To produce the molded polyurethane products, a foamable reaction mixture containing an organic polyisocyanate, compounds which contain at least two hydrogen atoms capable of reacting with isocyanates and additives is introduced into closed, heatable molds in which the mixture foams up and then solidifies in a very compressed state. The resin completely fills the mold and accurately reproduces the internal surfaces of the mold.

The molds are preferably made of a material with a high thermal capacity and high thermal conductivity, the material used being preferably metal although other materials such as synthetic resins, glass, wood, etc. may also be used.

The mold is usually covered with a mold release agent so that parts of the foam resin will not adhere to the surface when the foam resin product is released from the mold. Waxes, soaps or oils, for example, are among the various mold release agents in use. These mold release agents form a thin film between the surface of the mold and the foam resin product. This film does not adhere either to the mold or to the synthetic resinous product and therefore facilitates release of the product from the mold.

This prior art method has various disadvantages for the production of a series of molded products. The mold release agent must be applied repeatedly at regular intervals and, during this time, the mold is unavailable for production. Fine engravings in the mold, for example to imitate the structure of wood or grain of leather, become covered with residues of mold release agent in the course of time. Removal of these firmly adhering residues from the molds which frequently have a very complex internal surface requires considerable effort. The molded products also become coated with a thin film of the release agent, to which lacquer systems will not adhere. The surfaces of the molded product must therefore be ground or cleaned with solvents before they are lacquered in order that the lacquer will adhere sufficiently firmly to the synthetic resin.

In U.S. Pat. No. 3,726,952, it has been disclosed that the application of a mold release agent to the mold can be obviated by mixing the foamable reaction mixture with certain additives which modify the properties of the finished synthetic resin product so that it can easily be released from metal molds without any damage to its surface. Among the additives which have been proposed for this purpose are salts of aliphatic carboxylic acids containing at least 25 carbon atoms with amines, perferably primary amines, or amines which contain amide or ester groups.

In German Offenlegungsschrift No. 2,121,670 there is disclosed a process for the production of foam resins by foaming a reaction mixture of organic polyisocyanates, compounds which contain reactive hydrogen atoms, water and/or organic blowing agents and additives in a closed mold, the additives used being, e.g. a mixture of (a) salts of aliphatic carboxylic acids containing at least 20 aliphatic carbon atoms with amines which may contain amide and/or ester groups and (b) natural and/or synthetic oils, fats, or waxes.

Since these additives have an internal lubricating effect on the synthetic resin mixture they also impart excellent flow properties to the synthetic resin in the mold and reduce the formation of bubbles on the surface of the synthetic resin. In addition, these internal mold release agents have an antistatic effect and they impart excellent mold release properties even in metal molds which have a very complicated surface. Although excellent mold release effects can be obtained by these disclosed methods, it has been found in practice that the esters of higher fatty acids or their mixed esters frequently used as synthetic oils or waxes are insufficiently compatible with the isocyanate or polyol components used as starting materials for the foams, i.e. mixtures of these starting components with the fatty acid esters used as mold release agents are frequently unstable in storage and separate into their individual phases. Although this process of separation can be prevented by stirring the contents in the storage containers, this is not a satisfactory commercial solution to the problem because the storage containers are in most cases not equipped with stirrers. Moreover, the separation process may have already occurred during the transport of the material.

The problem of finding internal mold release agents which will form a stable mixture with at least one of the starting components of the foam so that the mixture will have no tendency to undergo phase separation has existed.

It is therefore an object of this invention to provide an improved process for molding foamable reaction mixtures containing an organic polyisocyanate. Another object of this invention is to provide a process for molding foamable mixtures containing an organic polyisocyanate and an internal mold release agent which is devoid of the foregoing disadvantages. Still another object of this invention is to provide a foamable reaction mixture containing an organic polyisocyanate and an effective internal release agent which is miscible with the other components of the mixture. A further object of the invention is to provide a foamable reaction mixture containing an organic polyisocyanate adapted for molding a series of products one after the other without interruption for the application of a mold release to the surface of the mold.

The foregoing objects and others are accomplished in accordance with this invention, generally speaking, by providing a process for molding a foamable reaction mixture containing an organic polyisocyanate and a reaction product of an organic polyisocyanate with an ester or mixed ester of a higher fatty acid which contains active hydrogen atoms as a mold release agent. It has now surprisingly been found that reaction products of organic polyisocyanates with esters or mixed esters of higher fatty acids which contain active hydrogen atoms (hereinafter referred to as "fatty acid esters") used either alone or in combination with other mold release agents or systems of mold release agents provide excellent mold release properties in the molding of a foamable reaction mixture containing an organic polyisocyanate and, that, moreover, these fatty acid esters will dissolve in the foamable mixture and will not undergo phase separation.

A process in which foams are produced by foaming a reaction mixture containing an organic polyisocyanate, an organic compound containing hydrogen atoms reactive with a polyisocyanate and having a molecular weight of at least 62, preferably 62 to about 10,000, water and/or organic blowing agents and optionally other additives together with a reaction product of a fatty acid ester and a polyisocyanate in a closed mold is preferred.

The mold release effect can be measured by the force in kp/cm$^2$ which is required to open the mold when removing the molded product. It can also be assessed subjectively by opening a suitable mold by hand and removing the foam panel (20×20×1 cm) which has partly foamed. The mold release forces required for foams which have been treated with the mold release reaction products provided by the invention are considerably lower than those required for comparable foams which have been produced by foaming reaction mixtures without these additives.

For the purpose of this invention, foam resins based on organic polyisocyanates are understood to mean both foams which are produced from an organic polyisocyanate alone and those which can be obtained by addition of an organic polyisocyanate with an organic compound which contains at least two Zerewitinow active hydrogen atoms, e.g. polycarbodiimide foam, polyisocyanurate foam, polyurea foam, polybiuret foam, polyamide foam, polyallophanate foam or polyurethane foam, or foams containing a mixture of urethane, urea, allophanate, biuret, amide, carbodiimide and/or isocyanurate groups and any other foam based on a polyisocyanate. The process described here is particularly suitable for the production of foams which contain urethane groups prepared from a foamable reaction mixture containing an organic polyisocyanate.

Any suitable organic polyisocyanate may be used such as, for example, an aliphatic, cycloaliphatic, araliphatic, aromatic or heterocyclic polyisocyanate including those described by W. Siefgen in Justus Liebigs Annalen der Chemie, 562, pages 75 to 136. Examples of suitable polyisocyanates are ethylene diisocyanate, tetramethylene-1,4-diisocyanate, hexamethylene-1,6-diisocyanate, dodecane-1,12-diisocyanate, cyclobutane-1,3-diisocyanate, cyclohexane-1,3-diisocyanate, cyclohexane-1,4-diisocyanate and any mixtures of these isomer, 1-isocyanato-3,3,5-trimethyl-5-isocyanatomethyl-cyclohexane (German Ausleschrift No. 1,202,785), hexahydrotolylene-2,4-diisocyanate and hexahydrotolylene-2,6-diisocyanate and any mixtures of these isomers, hexahydrophenylene-1,3-diisocyanate, hexahydrophenylene-1,4-diisocyanate, perhydrodiphenylmethane-1,4'-diisocyanate, perhydrodiphenylmethane-4,4'-diisocyanate, phenylene-1,3-diisocyanate, phenylene-1,4-diisocyanate, tolylene-2,4-diisocyanate, tolylene-2,6-diisocyanate and any mixtures of these isomers, diphenylmethane-2,4'-diisocyanate, diphenylmethane-4,4'-diisocyanate, naphthylene-1,5-diisocyanate, triphenylmethane-4,4',4"-triisocyanate, polyphenyl-polymethylene polyisocyanates which may be obtained by aniline-formaldehyde condensation followed by phosgenation and which have been described, e.g. in British Pat. No. 874,430 and 848,671; perchlorinated aryl polyisocyanates as described e.g. in German Auslegeschrift No. 1,157,601; polyisocyanates which contain carbodiimide groups as described in German Patent Specification No. 1,092,007; the diisocyanates described in U.S. Pat. Specification No. 3,492,330; polyisocyanates which contain allophanate groups as described e.g. in British Patent Specification No. 994,890; Belgian Pat. Specification No. 761,626 and published Dutch Patent Application No. 7,102,524, polyisocyanates which contain isocyanurate groups as described e.g. in German Pat. Specifications No. 1,022,789; 1,222,067 and 1,027,394 and in German Offenlegungsschriften No. 1,929,034 and 2,004,048; polyisocyanates which contain urethane groups as described e.g. in Belgian Patent Specification No. 752,261 or in U.S. Pat. Specification No. 3,394,164; polyisocyanates which contain acylated urea groups as described in German Patent Specification No. 1,230,778, polyisocyanates which contain biuret groups as described e.g. in German Pat. Specification No. 1,101,394; in British Pat. Specification No. 889,050 and in French Pat. Specification No. 7,017,514; polyisocyanates prepared by telomerisation reactions as described e.g. in Belgian Pat. Specification No. 723,640; polyisocyanates which contain ester groups as described e.g. in British Pat. Specification Nos. 965,474 and 1,072,956; in U.S. Pat. Specification No. 3,567,763 and in German Patent Specification No. 1,231,688 and reaction products of the above mentioned isocyanates with acetals according to German Pat. Specification No. 1,072,385.

The distillation residues obtained from the commercial production of isocyanates, which still contain isocyanate groups, may also be used, if desired in the form of solutions in one or more of the above mentioned polyisocyanates. Any mixtures of the above mentioned polyisocyanates may also be used.

It is generally preferred to use commercially readily available polyisocyanates, e.g. tolylene-2,4-diisocyanate and tolylene-2,6-diisocyanate and any mixtures of these isomers ("TDI") polyphenyl-polymethylene-polyisocyanates obtained by aniline-formaldehyde condensation followed by phosgenation ("crude MDI") and polyisocyanates which contain carbodiimide groups, urethane groups, allophanate groups, isocyanurate groups, urea groups or biuret groups ("modified polyisocyanates").

Organic compounds with a molecular weight generally between 62 and 10,000 which contain at least two hydrogen atoms capable of reacting with isocyanates may also be used as one of the starting components of the foamable reaction mixture. These may be compounds which contain amino groups, thiol groups or carboxyl groups but are preferably organic polyhydroxyl compounds, in particular polyhydric alcohols containing 2 to 8 hydroxyl groups and especially those having a molecular weight of 800 to 10,000, preferably 1000 to 6000, e.g. the polyesters, polyethers, polythioethers, polyacetals, polycarbonates and polyester amides containing at least two, generally 2 to 8, but preferably 2 to 4 hydroxyl groups which are known per se for the production of homogeneous and cellular polyurethanes.

Any suitable polyester containing hydroxyl groups may be used, e.g. the reaction products of polyhydric alcohols, preferably dihydric alcohols to which trihydric alcohols may be added, with polybasic carboxylic acids, preferably dibasic carboxylic acids. Instead of using free polycarboxylic acids, the corresponding polycarboxylic acid anhydrides or polycarboxylic acid esters of lower alcohols or mixtures thereof may be used for producing the polyesters. The polycarboxylic acids may be aliphatic, cycloaliphatic, aromatic and/or heterocyclic and may be substituted, e.g. by halogen atoms, and/or unsaturated. The following are mentioned as examples: succinic acid, adipic acid, suberic acid, azelaic acid, sebacic acid, phthalic acid, isophthalic acid, trimellitic acid, phthalic acid anhydride, tetrahydrophthalic acid anhydride, hexahydrophthalic acid anhydride, tetrachlorophthalic acid anhydride, endomethylene tetrahydrophthalic acid anhydride, glutaric acid anhydride, maleic acid, maleic acid anhydride, fumaric acid, dimeric and trimeric fatty acids such as oleic acid optionally mixed with monomeric fatty acids, dimethyl terephthalate and bis-glycol terephthalate. The following are examples of suitable polyhydric alcohols: ethylene glycol, propylene-1,2-glycol propylene-1,3-glycol, butylene-1,4-glycol, butylene-2,3-glycol, hexane-1,6-diol, octane-1,8-diol, neopentyl glycol, cyclohexane dimethanol (1,4-bis-hydroxy-methylcyclohexane), 2-methyl-propane-1,3-diol, glycerol, trimethylolpropane, hexane-1,2,6-triol, butane-1,2,4-triol, trimethylolethane, pentaerythritol, quinitol, mannitol, sorbitol, methyl glycoside, diethylene glycol, triethylene glycol, tetraethylene glycol, polyethylene glycols, dipropylene glycol, polypropylene glycols, dibutylene glycol and polybutylene glycols. The polyesters may also contain terminal carboxyl groups. Polyesters of lactones such as ε-caprolactone or of hydrocarboxylic acids such as ω-hydroxycaproic acid may also be used. The low molecular weight polyhydric alcohols mentioned above may also be used as such.

Polyethers used according to the invention which contain at least 2 and generally 2 to 8, preferably 2 or 3 hydroxyl groups are also known per se and may be prepared, e.g. by the polymerisation of epoxides such as ethylene oxide, propylene oxide, butylene oxide, tetrahydrofuran, styrene oxide or epichlorohydrin, each with itself, e.g. in the presence of $BF_3$, or by the addition of these epoxides, either alone, as mixtures or successively, to starting components which contain reactive hydrogen atoms such as alcohols or amines, e.g. water, ethylene glycol, propylene-1,3-glycol, propylene-1,2-glycol, trimethylolpropane, 4,4'-dihydroxydiphenylpropane, aniline, ammonia, ethanolamine or ethylene diamine. Sucrose polyethers such as those described, e.g. in German Auslegeschrift No. 1,176,358 and 1,064,938 may also be used according to the invention. It is frequently preferred to use polyethers which contain predominantly primary hydroxyl groups (up to 90% by weight, based on all the hydroxyl groups present in the polyether). Polyethers which have been modified by vinyl polymers are also suitable, e.g. the polyethers obtained by the polymerisation of styrene or acrylonitrile in the presence of polyethers (U.S. Pat. Specification Nos. 3,383,351; 3,304,273; 3,523,093 and 3,110,695 and German Patent Specification No. 1,152,536). Polybutadienes which contain hydroxyl groups may also be used.

Among the polythioethers there should be particularly mentioned the condensation products of thiodiglycol with itself and/or with other glycols, dicarboxylic acids, formaldehyde, aminocarboxylic acids or aminoalcohols. These products are either polythio mixed ethers, polythio ether esters or polythio ether ester amides, depending on the cocomponents.

The polyacetals used may be, for example, compounds prepared from glycols such as diethylene glycol, triethylene glycol, 4,4'-dioxethoxy-diphenyldimethylmethane, hexanediol and formaldehyde. Polyacetals suitable for the invention may also be prepared by polymerising cyclic acetals.

The polycarbonates with hydroxyl groups may be those known per se which can be prepared, for example, by reacting diols such as propane-1,3-diol, butane-1,4-diol and/or hexane-1,6-diol, diethylene glycol, triethylene glycol or tetraethylene glycol with diarylcarbonates such as diphenyl carbonate or phosgene.

Suitable polyester amides and polyamides include, for example, the predominantly linear condensates obtained from polybasic saturated and unsaturated carboxylic acids or their anhydrides and polyvalent saturated and unsaturated amino alcohols, diamines, polyamines and their mixtures.

Polyhydroxyl compounds which already contain urethane or urea groups and modified or unmodified natural polyols such as castor oil, carbohydrates or starch may also be used. Addition products of alkylene oxides with phenol formaldehyde resins or with urea formaldehyde resins may also be used for the process of the invention.

Representatives of these compounds are described, for example, in High Polymers, Volume XVI, "Polyurethanes, Chemistry and Technology", by Saunders and Frisch, published by Interscience Publishers, New York, London, Volume I, 1962, pages 32–34 and pages 44–54 and Volume II, 1964, pages 5–6 and 198–199 and in Kunststoff-Handbuch, Volume VII, Vieweg-Hochtlen, Carl-Hanser-Verlag, Munich, 1966, e.g. on pages 45 to 71.

Water and/or readily volatile organic substances may be used as blowing agents according to the invention. Suitable organic blowing agents are e.g. acetone, ethyl acetate, halogenated alkanes, such as methylene chloride, chloroform, ethylidene chloride, vinylidene chloride, monofluorotrichloromethane, chlorodifluoromethane, dichlorodifluoromethane and trichloro trifluoroethane, as well as butane, hexane, heptane or diethylether. A blowing effect can also be obtained by adding compounds which decompose at temperatures above room temperature to liberate gases such as nitrogen, e.g. azo compounds such as azo isobutyric acid nitrile. Other examples of blowing agents and details of their methods of use have been described in Kunststoff-Handbuch, Volume VII, published by Vieweg and Hochtlen, Carl-Hanser-Verlag, Munich 1966, e.g. on pages 108 to 109, 453 to 455 and 507 to 510.

Catalysts are frequently used in the process according to the invention. The catalysts used may be known per se, e.g. tertiary amines such as triethylamine, tributylamine, N-methyl-morpholine, N-ethyl-morpholine, N-cocomorpholine, N,N,N',N'-tetramethyl-ethylenediamine, 1,4-diaza-bicyclo-(2,2,2)-octane, N-methyl-N'-dimethylaminoethyl-piperazine, N,N-dimethylbenzylamine-bis-(N-diethylaminoethyl)-adipate, N,N-diethylbenzylamine, pentamethyldiethylenetriamine, N,N-dimethyl-cyclohexylamine, N,N,N',N'-tetramethyl-1,3-butanediamine, N,N-dimethyl-β-phenylethylamine, 1,2-dimethylimidazole, 2-methylimidazole and tetramethylguanidine.

Triethanolamine, triisopropanolamine, N-methyl-diethanolamine, N-ethyl-diethanolamine, N,N-dimethylethanolamine and their reaction products with alkylene oxides such as propylene oxide and/or ethylene oxide are examples of suitable tertiary amines which contain hydrogen atoms which are reactive with isocyanate groups.

Silaamines which contain carbon-silicon bonds may also be used as catalysts, e.g. the compounds described in German Pat. Specification No. 1,229,290 such as 2,2,4-trimethyl-2-silamorpholine and 1,3-diethylaminomethyl-tetramethyldisiloxane.

Bases which contain nitrogen, such as tetralkylammonium hydroxides, and alkali metal hydroxides such as sodium hydroxide, alkali metal phenolates such as sodium phenolate and alkali metal alcoholates such as sodium methylate are also suitable catalysts. Hexahydrotriazines may also be used as catalysts.

Organic metal compounds may also be used as catalysts, especially organic tin compounds.

The organic tin compounds used are preferably tin-(II) salts (stannous salts) of carboxylic acids such as tin(II) acetate, tin(II) octoate, tin(II) ethyl hexoate and tin(II) laurate and the dialkyl tin salts of carboxylic acids such as dibutyl tin diacetate, dibutyl tin dilaurate, dibutyl tin maleate or dioctyl tin diacetate.

Other examples of catalysts which may be used according to the invention and details of their mode of action are described in Kunststoff-Handbuch, Volume VII, published by Vieweg and Hochtlen, Carl-Hanser-Verlag, Munich, 1966, e.g. on pages 96 to 102.

Any catalytic amount of the catalyst may be used. The catalysts are generally used in quantities of between about 0.001% and 10% by weight, based on the weight of the organic compound having at least two hydrogen atoms capable of reacting with isocyanates and, preferably, a molecular weight of 62 to about 10,000.

Any suitable surface active additive may also be used in the process according to the invention (emulsifiers and foam stabilizers). Suitable emulsifiers are e.g. the sodium salts of ricinoleic sulphonates or the sodium salts of fatty acids or salts of fatty acids with amines such as oleic acid diethylamine or stearic acid diethanolamine. Alkali metal salts or ammonium salts of sulphonic acids such as dodecylbenzene sulphonic acid or dinaphthylmethane disulphonic acid or alkali metal or ammonium salts of fatty acids such as ricinoleic acid or of polymeric fatty acids may also be used as surface active additives.

The main foam stabilizers used are water-soluble polyether siloxanes. The structure of these compounds is generally such that a copolymer of ethylene oxide and propylene oxide is linked to a polydimethylsiloxane group. Foam stabilizers of this type have been described e.g. in U.S. Pat. Specification No. 3,201,272, Column 3, line 60 to Column 4, line 3.

Reaction retarders may also be used according to the invention, e.g. substances which are acid in reaction such as hydrochloric acid, sulphuric acid, phosphoric acid or organic acid halides, as well as cell regulators of known type such as paraffins or fatty alcohols or dimethylpolysiloxanes; in addition there may be used pigments or dyes and flame-retarding agents known per se, e.g. tris-chloroethyl phosphate or ammonium phosphate and polyphosphate, age resisters and stabilizers to protect against weathering, plasticizers, fungistatic and bacteriostatic substances, fillers such as barium sulphate, kieselguhr, carbon black or whiting.

Other examples of surface active additives, foam stabilizers and cell regulators, reaction retarders, stabilizers, flame retarding substances, plasticizers, dyes, fillers and fungistatic and bacteriostatic substances and details of their mode of action and methods of using these additives have been described in Kunststoff-Handbuch Volume VI, published by Vieweg and Hochtlen, Carl-Hanser-Verlag, Munich, 1966, e.g. on pages 103 to 113.

The foaming process is preferably carried out in molds. Foaming in the mold is carried out by introducing the reaction mixture into a mold suitably made of a metal such as aluminium or a synthetic resin, e.g. epoxy resin. The foamable reaction mixture reacts and expands inside the closed mold to form the molded product. Foaming may either be carried out so that the molded product has a cellular structure on its surface or it may be carried out to produce a molded product with a compact skin and cellular core. According to the invention the foamable reaction mixture may be introduced into the mold in such an amount that the resulting foam only just fills the closed mold. Alternatively, a larger quantity of reaction mixture than would be required for filling the interior of the closed mold with solidified cellular product may be introduced. This second method is known as over-charging. It has been disclosed, e.g. in U.S. Pat. Specification Nos. 3,178,490 and 3,182,104.

When foaming is carried out in molds, mold release agents already know per se may be used in addition.

The process according to the invention may also be used for producing cold setting foams (see British Pat. Specification No. 1,162,517 and German Offenlegungeschrift No. 2,153,086).

According to the invention, reaction products of fatty acid esters and organic polyisocyanates are added.

Suitable fatty acid esters are in particular those in which at least one aliphatic acid which contains more than 8 carbon atoms is built into the molecule and which have acid numbers of between 0 and 100, preferably between 0 and 40 and hydroxyl numbers between 0 and 150, preferably between 0 and 75, at least one of those two values being greater than 0.

The fatty acid esters used may also have the character of polyesters or mixed esters which may be prepared both from monofunctional and from polyfunctional carboxylic acids and/or alcohols. The fatty acid esters may be prepared from several different types of fatty acids or carboxylic acids and/or alcohols so that complicated fatty acid esters with an average molecular weight generally between 500 and 5000 and preferably between 800 and 3000 are obtained by a process of mixed condensation.

Amines or amino alcohols may also be used in the preparation of the fatty acid esters to produce fatty acid mixed esters which contain basic or amide groups. These mixed esters are suitable for the process according to the invention. Such mixed esters can be obtained, for example, by adding ammonia, monoalkylamines or dialkylamines or their alkoxylation products, for example with ethylene oxide, propylene oxide or higher epoxides or by using acid amides which contain carboxyl groups or alcohol groups. These acid amides may be obtained, for example, by the amidation of carboxylic acids with monoalkanolamines or dialkanolamines such as ethanolamine, diethanolamine, propanolamine, or dipropanolamine or the like.

The fatty acid esters used for the reaction with the polyisocyanates are preferably those which can be prepared by esterifying carboxylic acids with alcohols or which can be obtained from natural substrates. The following are examples of suitable carboxylic acids and alcohols: butanol, hexanol, octanol-isomers, dodecanol, oleyl alcohol, other fatty alcohols, natural or synthetic steroid alcohols, ricinoleic acid, ethylene glycol, propylene glycol, butanediols, hexanediols, glycerol, trimethylolpropane, pentaerythritol, sorbitol, hexitol, various sugars or addition products of alkylene oxides such as ethylene oxide or propylene oxide with these alcohols, and the like. Glycerol, trimethylolpropane, pentaerythritol and sorbitol are particularly suitable.

The carboxylic acids used may be saturated or unsaturated and are preferably aliphatic, for example octane carboxylic acids, dodecane acids, natural fatty acids such as ricinoleic acid, oleic acid, elaidic acid, stearic acid, palmitic acid, linoleic acid, linolenic acid acid, train oil fatty acids, fatty acids obtained from coconut oil, tallow fatty acids or fatty acids obtained by paraffin oxidation, tall oil fatty acids, succinic acid, maleic acid, citric acid, azelaic acid, adipic acid or higher dicaroxylic and polycarboxylic acids, oligomerisation products of unsaturated carboxylic acids and addition products of maleic acid with natural and synthetic oils, and the like. The following are particularly suitable: oleic acid, linoleic acid, ricinoleic acid and adipic acid.

Preparation of the fatty acid esters is most suitably carried out by the cocondensation of the alcohols and acids at temperatures above 100° C., preferably at 120° to 180° C., optionally in a vacuum, the process of the elimination of water being continued until the desired hydroxyl and acid numbers or average molecular weights have been obtained. The process of esterification may, of course, be catalysed with acid or basic catalysts and the water may be eliminated by azeotropic distillation. The products prepared and used according to the invention preferably contain hydroxyl and/or carboxylic acid groups.

Fatty acid esters which have been found to be particularly suitable for the process are the condensates of oleic acid with a dicarboxylic acid such as adipic acid and a polyfunctional alcohol, e.g. pentaerythritol, which have molecular weights of between 900 and 2500 and hydroxyl numbers of between 30 and 70 and acid numbers of between 3 and 30.

There is not always a direct stoichiometric connection between the acid numbers and hydroxyl numbers obtained and the molar ratio of the components used, possibly because side reactions of unknown type take place side by side with esterification.

Ricinoleic acid polyesters which have a molecular weight of between 800 and 2500 are also of particular interest.

In principle, any known organic polyisocyanate may be used for the reaction with the fatty acid esters, e.g. the polyisocyanates mentioned above as starting components for the production of the foams.

Reaction of the fatty acid ester or mixtures of fatty acid esters with the polyisocyanates is carried out by mixing the fatty acid ester with the polyisocyanate and reacting the components at temperatures between 30° C. and 200° C., preferably between 45° C. and 95° C., optionally with stirring. Lower reaction temperatures could also in principle be used but the length of time which would then be required for complete reaction of the components to obtain suitable reaction products for the process would be uneconomical. Although the reaction could be accelerated by means of catalysts, this should be avoided in order to prevent as far as possible any deleterious effect on the reactivity of the polyisocyanate components during the subsequent production of the foams.

The molar ratio of active hydrogen atoms to isocyanate groups in the reaction of the fatty acid ester with the polyisocyanate is generally maintained between 1:1 and 1:25. The reaction products are frequently prepared by reacting a mixture of 0.5 to 50% by weight, (preferably 1 to 35% by weight) of fatty acid esters and 99.5 to 50% by weight (preferably 99 to 65% by weight) of polyisocyanate at a temperature of between 30° C. and 200° C.

The reaction products used according to the invention may be added as such to the starting components used for production of the foams, e.g. to the polyisocyanate or to the polyol, but it is in many cases advantageous to prepare the reaction products in situ in the polyisocyanate used as starting material for the production of foams. In this case, the quantity of fatty acid ester used in generally between 0.5 and 25% by weight, preferably between 2 and 18% by weight, based on the quantity of polyisocyanate. Preparation of the reaction product in situ in the excess polyisocyanate results in a product which can be used directly for foaming ("modified" polyisocyanate): this results in foams which have excellent properties for easy release from the mold.

As already described above, however, the reaction products of polyisocyanates and fatty acid esters may first be prepared separately and later diluted with an additional quantity of polyisocyanate which may be a different polyisocyanate, or alternatively the reaction product used according to the invention may be added separately during production of the foam.

The formulations for the foam resin may, of course, also contain other mold release agents or systems of mold release agents, for example those described in German Offenlegungsschrift No. 1,953,637 or in Belgian Patent Specification No. 782,942, e.g. the oleic acid salt or tall oil fatty acid salt of the amide-containing amine which is obtained by reaction N-dimethylaminopropylamine with oleic acid or tall oil fatty acid.

In the process according to the invention, the components are reacted together by the known one-step, prepolymer or semiprepolymer process, often using a mechanical device such as are described in U.S. Patent Specification No. 2,764,565. Details concerning processing apparatus which may also be used according to the invention are described in Kunststoff-Handbuch, Volume VI, published by Vieweg and Hochtlen, Carl-Hanser-Verlag, Munich 1966, e.g. on pages 121 to 205.

The process may be used for producing rigid products suitable for the manufacture of furniture parts, parts of the bodywork of vehicles, technical instruments and structural elements or semirigid to flexible products suitable for the manufacture of safety padding in automobiles or elastic shoe soles.

The process according to the invention will now be described with the aid of examples. The parts given are parts by weight unless otherwise indicated. The polysiloxane stabilizer used in the working examples has the average formula:

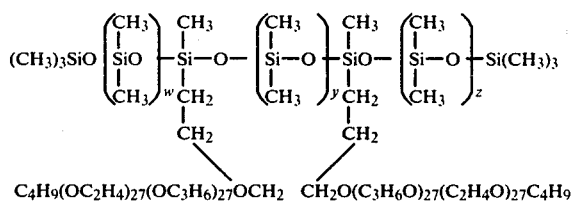

where the sum of w, y and z is about 16.

EXAMPLES

The preparation of several fatty acid esters will first be described by way of example. The method of preparation described is applicable in principle to practically all types of fatty acid esters.

Fatty acid ester A

544 Parts of pentaerythritol, 3390 parts of oleic acid, and 292 parts of adipic acid are stirred together under an atmosphere of nitrogen for 8 hours at 140° C. The reaction mixture is then stirred under a vacuum at 140° C. for 24 hours and then under a water jet vacuum at 160° C. for 5 hours. The end product is a clear, viscous liquid which has an average molecular weight of 1100 (cryoscopic), OH number 19.5 and acid number 25.0.

Fatty acid ester B

580 Parts of pentaerythriol, 3390 parts of oleic acid, and 292 parts of adipic acid are heated to 150° C. under a water jet vacuum in the course of 20 hours and then left under a vacuum at 150° C. for 3 hours. The condensation product obtained has an OH number of 54.3 and an acid number of 25.5. The average molecular weight is found to be 905.

Fatty acid ester C

The same as fatty acid ester B except that it is left under a vacuum at 150° C. for 10 hours. The ester obtained has an OH number of 53.1, an acid number of 5.6 and an average molecular weight of 1320.

Fatty acid ester D

300 Parts of ricinoleic acid are heated to 140° C. under a water jet vacuum and stirred at this temperature for 35 hours. A clear polyester with an average molecular weight of 1800, OH number 30.3 and acid number 34.6 is then obtained.

Fatty acid ester E

The method is the same as that used for preparing fatty acid ester D except that the reaction mixture is kept under a water jet vacuum at 140° C. for only 15 hours. The resulting ester has an average molecular weight of 1070.

Fatty acid ester F

Ester of 4 mols of train oil fatty acid (average molecular weight about 285) and 1 mol of sorbitol, acid number approximately 3 and OH number approximately 130.

Fatty acid ester G

Natural wool fat, OH number approximately 53, acid number approximately 0.7.

When fatty acid esters A to G are mixed with one of the polyisocyanates mentioned in the following Examples so that the mixture contains about 5–10% by weight of the fatty acid ester, the mixture prepared at room temperature separates into two phases in the course of a few hours or days. This effect is undesirable and, as shown in the following Examples which serve only to explain the process but not to restrict it to the mixtures indicated, it can be prevented according to the invention by a temperature treatment which results in the formation of the reaction products used according to the invention.

The mixtures of polyisocyanate and reaction product used in the following Examples therefore do not show this separation effect.

EXAMPLE 1

(A) Preparation of the reaction product used according to the invention in the polyisocyanate 95 Parts by weight (0.38 mol) of a polyisocyanate which has been prepared by the phosgenation of anilineformaldehyde condensates and which has a viscosity of 320 cP at 25° C. and an NCO content of 31.5% by weight and 5 parts by weight (0.004 mol) of fatty acid ester A are used.

The components are reacted at 70° C. The reaction mixture is kept at 70° C. for 4 hours with stirring. After termination of the reaction, the NCO content of the polyisocyanate which contains the reaction product is 29% by weight.

(B) Process according to the invention

100 Parts by weight of a polyol mixture which has an OH number of 550 and a viscosity of 1650 cP at 25° C. and which consists of (1) 60 parts by weight of a polyether with OH number 830 which has been obtained by the addition of propylene oxide to trimethylolpropane and (2) 40 parts by weight of a polyether with OH number 42 which has been obtained by the addition of propylene oxide and ethylene oxide (as a mixture) to a mixture of trimethylolpropane and propylene glycol (molar ratio 3:1), 1 part by weight of a polysiloxane-polyalkylene oxide block copolymer as foam stabilizer, 0.7 parts by weight of tetramethylguanidine as catalyst, 12 parts by weight of monofluorotrichloromethane and 156 parts by weight of the polyisocyanate described under 1A are used as starting components. The polyol mixture and blowing agent are introduced into a two-component dosing and mixing apparatus where they are vigorously mixed with the polyisocyanate to prepare the foaming reaction mixture which is then immediately introduced into a metal mold heated to 60° C. The bottom die of the mold consists of electroplated nickel and the top die of rolled aluminium. The molding to be produced is a rectangular box with a wall thickness of 15 mm and the following dimensions: Base 360×250 mm, height of sides 40 mm. The mold is connected to a hydraulic closing unit which enables the opening forces to be accurately measured. The opening force is converted into an electric signal by way of a force detecting element, amplified in a carrier frequency amplifier and recorded with a compensated line printer. The recorded data are used first to calculate the specific opening forces required to open the mold and second to determine the forces required to remove the molded product from the bottom die by means of ejectors. The product is released from the mold 7 minutes after the introduction of the reaction mixture into the mold.

The mold can be opened with a specific opening force of less than 0.02 kp/cm². The ejectors required a specific opening force of 0.11 kp/cm² to release the product from the mold. Similar results are obtained when fatty acid ester B or C is used instead of fatty acid ester A.

EXAMPLE 2

100 Parts by weight of the polyol mixture according to 1B, 12 parts by weight of monofluorotrichloromethane, 3 parts by weight of amidamine oleic acid salt (prepared from 1 mol of 3-dimethylamino-propylamine-1 and 2 mols of oleic acid), 156 parts by weight of the polyisocyanate according to 1A are used as starting components. Foaming is carried out as described in 1B. The mold can be opened with a specific opening force of less than 0.02 kp/cm². The ejectors require a specific opening force of 0.04 kp/cm² to release the product from the mold. Similar results are obtained when fatty acid ester B or C is used instead of fatty acid ester A.

EXAMPLE 3

100 Parts by weight of the polyol mixture according to 1B, 12 parts by weight of monofluorotrichloromethane and 147 parts by weight of a polyisocyanate which has been obtained by the phosgenation of aniline-formaldehyde condensates and which has a viscosity of 320 cP at 25° C. and an NCO content of 31.5% are used as starting components.

Foaming is carried out as described in 1B. The mold cannot be opened even when the hydraulic system is operated with its maximum power of 0.8 kp/cm². When the ejectors are used for releasing the product from the mold they perforate the product.

EXAMPLE 4

(A) Preparation of the reaction product used according to the invention in the polyisocyanate 95 Parts by weight (0.32 mol) of a polyisocyanate which has been obtained by the phosgenation of aniline-formaldehyde condensates followed by reaction with a diol which has a hydroxyl number of 580, which polyisocyanate has a viscosity of 430 cP at 25° C. and an isocyanate content of 28% by weight, are reacted with 5 parts by weight of fatty acid ester A at 70° C. The reaction mixture is kept at 70° C. for 4 hours with stirring. After termination of the reaction, the isocyanate content of the polyisocyanate which contains the reaction product is 26% by weight.

(B) Process according to the invention

100 Parts by weight of a polyol mixture which has an OH number of 510 and a viscosity of 1230 cP at 25° C. and which consists of (1) 20 Parts by weight of a polyether with a hydroxyl number of 540 which has been obtained by the addition of ethylene oxide to trimethylolpropane and (2) 20 parts by weight of a polyester with hydroxyl number 380 which has been obtained by reacting 1 mol of adipic acid, 2.6 mols of phthalic acid anhydride and 1.3 mols of oleic acid with 6.9 mols of trimethylolpropane, 1 part by weight of a polysiloxane-polyalkylene oxide block copolymer as foam stabilizer, 0.7 parts by weight of tetramethylguanidine as catalyst, 5 parts by weight of monofluorotrichloromethane, and 160 parts by weight of the polyisocyanate according to 4A are used as starting components. The crude mixture is foamed up to produce a molded product in accordance with 1B.

After the reaction has been left in the mold for 7 minutes, the forces required for opening the mold amount to 0.03 kp/cm². The ejectors force the molded product out of the mold with a specific force of 0.01 kp/cm². Similar results are also obtained when fatty acid esters B and C are used.

EXAMPLE 5

The procedure is the same as that described in Example 4B but the polyisocyanate used in the foaming mixture, which is otherwise the same as in Example 4B, does not contain the reaction product of the fatty acid ester. A molded product is produced as described in Example 1B. After leaving the reaction mixture in the mold for 7 minutes, the mold cannot be opened with the hydraulic system, which means that the forces required for opening the mold are greater than 0.8 kp/cm². The mechanical ejectors destroy the molded product when they are used for forcing it out of the mold.

EXAMPLE 6

(A) Preparation of the reaction product used according to the invention in the polyisocyanate 95 Parts by weight of a polyisocyanate obtained by aniline-formaldehyde condensation followed by phosgenation are reacted at 70° C. with 5 parts by weight (0.003 mol) of fatty acid ester D which has a viscosity of 1075 cP at 25° C. and a molecular weight of 1600. The reaction mixture is kept at 70° C. for 4 hours with stirring. After termination of the reaction, the isocyanate content of the polyisocyanate which contains the reaction product is 29% by weight.

(B) Process according to the invention

100 Parts by weight of the polyol mixture according to 1B, 1 part by weight of a polysiloxane-polyalkylene oxide block copolymer as foam stabilizer, 12 parts by weight of monofluorotrichloromethane, 0.7 parts by weight of tetramethylguanidine as catalyst and 156 parts by weight of the modified isocyanate according to 6A are reacted to produce a molded polyurethane product as described in Example 1B. After 7 minutes, the molded product is removed from the metal mold which is at a temperature of 60° C. A specific opening force of 0.16 kp/cm² is required for opening the mold. The mechanical ejectors release the product from the mold with a specific ejecting force of 0.38 kp/cm². Similar results are obtained when fatty acid ester E is used.

EXAMPLE 7

The foaming mixture used is the same as that described in 6B with the addition of 3 parts by weight of amidamine oleic acid as in Example 2. Foaming is carried out as described in 1B.

The molded polyurethane product can be removed from the metal mold after 7 minutes. A specific opening force of 0.06 kp/cm² is required for opening the mold. The mechanical ejectors release the product from the mold with a specific force of 0.24 kp/cm².

EXAMPLE 8

(A) Preparation of a polyisocyanate which contains the reaction product used according to the invention 90 Parts by weight (0.52 mol) of an isomeric mixture of 80% by weight of tolylene-2,4-diisocyanate and 20% by weight of tolylene-2,6-diisocyanate (viscosity 3 cP at 25° C., isocyanate content 48.3% by weight) are reacted with 10 parts by weight (0.008 mol) of fatty acid ester A at 70° C. The reaction mixture is kept at 70° C. for 4 hours with stirring. After termination of the reaction, the isocyanate content of the polyisocyanate which contains the reaction product is 43% by weight.

(B) Process according to the invention

100 Parts by weight of the polyol mixture according to 1B, 1 part by weight of foam stabilizer according to 1B, 12 parts by weight of monofluorotrichloromethane, 0.7 part by weight of tetramethylguanidine, 3 parts by weight of the amidamine oleic acid salt used in Example 2 and 95 parts by weight of the polyisocyanate according to 8A are weighed into a stirrer vessel and vigorously mixed for 10 seconds by means of a high speed stirrer (3000 revs/min) and then immediately introduced into a metal mold heated to 60° C. The metal mold consists of an aluminium block which is adapted to be heated with water and which has a mold cavity measuring 300×200×10 mm in which the molded polyurethane products are produced. The mold is designed to be opened and closed by hand. The foaming mixture results in a molded foam product which can easily be removed by hand from the metal mold described above.

EXAMPLE 9

100 Parts by weight of the polyol mixture according to 1B, 1 part by weight of the foam stabilizer according to 1B, 12 parts by weight of monofluorotrichloromethane, 0.7 part by weight of tetramethylguanidine and 85 parts by weight of an isomeric mixture of 80 percent by weight of tolylene-2,4-diisocyanate and 20 percent by weight of tolylene-2,6-diisocyanate are used for producing a molded product as described in Example 8. When attempts are made to remove the product from the mold after 7 minutes, it breaks in the mold. The fragments stick firmly to the walls of the mold.

EXAMPLE 10

(A) Preparation of a polyisocyanate which contains the reaction product used according to the invention 99 Parts by weight (0.4 mol) of a polyisocyanate which has been obtained by the phosgenation of aniline-formaldehyde condensates and which has a viscosity of 320 cP at 25° C. and an isocyanate content of 31.5% by weight are reacted with 1 part by weight of fatty acid ester G at 100° C.

The reaction mixture is kept at 100° C. for 8 hours with stirring. After termination of the reaction, the isocyanate content of the polyisocyanate which contains the reaction product is 31% by weight.

(B) Process according to the invention

100 Parts by weight of the polyol mixture according to 1B, 1 part by weight of the foam stabilizer according to 1B, 12 parts by weight of monofluorotrichloromethane, 0.7 part by weight of tetramethylguanidine, 3 parts by weight of amidamine oleic acid salt (according to Example 2) and 132 parts by weight of the polyisocyanate according to 10A are reacted to produce a molded product as described in Example 8B. After the reaction has terminated and the reaction product been left to stand in the mold for 7 minutes, the product can easily be removed from the metal mold by hand.

EXAMPLE 11

(A) Preparation of a polyisocyanate which contains the reaction product according to the invention 95 Parts by weight of a polyisocyanate used in Example 1A are reacted with 5 parts by weight (0.006 mol) of fatty acid ester F at 70° C.

The reaction mixture is kept at 70° C. for 4 hours with stirring. After termination of the reaction, the isocyanate content of the polyisocyanate which contains the reaction product is 29% by weight.

(B) Process according to the invention

100 Parts by weight of the polyol mixture according to 1B, 1 part by weight of foam stabilizer according to 1B, 12 parts by weight of monofluorotrichloromethane, 0.7 part by weight of tetramethylguanidine as catalyst, 3 parts by weight of the amidamine oleic acid salt according to Example 2 and 156 parts by weight of the polyisocyanate according to Example 11A, are reacted together to produce a molded product as described in Example 8B. The molded product can easily be released from the metal mold by hand.

EXAMPLE 12

The same components as in Example 11B are used but the polyisocyanate consists of 132 parts by weight of a polyisocyanate which has been obtained by the phosgenation of aniline-formaldehyde condensates and has a viscosity of 320 cP at 25° C. and an NCO content of 31.5% by weight.

The mixture is reacted to produce a molded product as described in Example 8B. The product can be released from the metal mold only with difficulty but without breaking.

EXAMPLE 13

The foaming mixture used is the same as in Example 12 but without the salt used in Example 2.

The reaction mixture is reacted as described in Example 8B. The molded product is hardened after 7 minutes but the metal mold cannot be opened without destroying the molded product.

EXAMPLE 14

(A) Preparation of the reaction product used according to the invention

70 Parts by weight (0.26 mol) of a polyisocyanate which has been prepared by the phosgenation of aniline-formaldehyde condensates and which has a viscosity of 320 cP at 25° C. and an isocyanate content of 31.5% by weight are reacted with 30 parts by weight (0.022 mol) of fatty acid ester A.

The polyisocyanate is heated to 70° C. and the fatty acid ester is slowly added with vigorous stirring. The reaction mixture is kept at 70° C. for 6 hours, at the end of which time the isocyanate content of the reaction product is 20.5% by weight and its viscosity 460 cP.

(B) Process according to the invention

100 Parts by weight of a polyol mixture according to 1B, 12 parts by weight of monofluorotrichloromethane, 3 parts by weight of amidamine oleic acid salt (prepared from 1 mol of 3-dimethylamino-propylamine-1 and 2 mols of oleic acid), 110 parts by weight of a polyisocyanate which is not modified and which has been prepared by the phosgenation of aniline-formaldehyde condensates and has an isocyanate content of 31.5%, and 33 parts by weight of the modified polyisocyanate described under 14A.

The polyol mixture and blowing agent are introduced into a two-component dosing and mixing apparatus and foamed up as in Example 1A. The mold can be opened with a specific opening force of less than 0.02 kp/cm². The ejectors require a specific opening force of 0.08 kp/cm² to release the molded product.

Although the invention has been described in detail for the purpose of illustration, it is to be understood that such detail is solely for that purpose and that those skilled in the art can make variations therein without departing from the spirit and scope of the invention except as it may be limited by the claims.

What is claimed is:

1. In a process for the production of molded articles of polyurethane foam by foaming a reaction mixture in a closed mold, said reaction mixture comprising a polyisocyanate, an organic compound containing at least two hydrogen atoms reactive with isocyanates, and a blowing agent, the improvement wherein said polyisocyanate consists of the reaction product of
   (a) an organic polyisocyanate, and
   (b) from 0.5 to 25% by weight based on the quantity of said organic polyisocyanate, of an active hydrogen-containing fatty acid ester prepared by reacting an alcohol with an aliphatic, saturated or unsaturated fatty acid, said ester being characterized in that at least one aliphatic acid which contains more than 8 carbon atoms is built into the molecule, said ester further characterized as having an acid number of 0 to 100 and a hydroxyl number of 0 to 150 with at least one of said numbers being greater than 0 and said ester having an average molecular weight of from 500 to 5000.

2. The process of claim 1, wherein said fatty acid is selected from the group consisting of octane carboxylic acids, dodecane acids, oleic acid, elaidic acid, stearic acid, palmitic acid, linoleic acid, linolenic acid, train oil fatty acids, fatty acids obtained from coconut oil, tallow fatty acids, fatty acids obtained by paraffin oxidation, tall oil fatty acids, and addition products of maleic acid with natural and synthetic oils.

3. The process of claim 2, wherein said fatty acid ester is prepared by reacting an alcohol with an aliphatic saturated or unsaturated fatty acid and a dicarboxylic acid.

4. The process of claim 3, wherein said dicarboxylic acid is selected from the group consisting of succinic acid, maleic acid, citric acid, azelaic acid and adipic acid.

5. The process of claim 1, wherein said reaction product is prepared by reacting said components (a) and (b) at a temperature of between 30° C. and 200° C.

6. The process of claim 1, wherein said organic polyisocyanate is the phosgenation product of aniline-formaldehyde condensates.

7. The process of claim 1, wherein the reaction mixture contains in addition to a fatty acid ester/polyisocyanate reaction product a mixture of mold release agents other than said reaction product.

8. The process of claim 7, wherein the mixture of mold release agent contains an oleic acid or tall oil fatty acid salt of the amide-containing amine which is the reaction product of N-dimethylaminopropylamine and oleic acid or tall oil fatty acid.

9. The process of claim 1, wherein said component (b) is present in amounts of from 2 to 18% by weight.

10. The process of claim 1, wherein the fatty acid ester is an ester of (a) oleic acid or tall oil fatty acid, (b) a dicarboxylic acid and (c) a polyhydric alcohol.

11. The process of claim 1, wherein the fatty acid ester is an ester of (a) oleic acid, (b) adipic acid and (c) pentaerythritol, said ester having an acid number of about 3 to about 30 and a hydroxyl number of about 30 to about 70 and an average molecular weight of about 900 to about 2500.

12. The process of claim 1, wherein the fatty acid ester is a ricinoleic acid polyester having a molecular weight of between 800 and 2500.

* * * * *